(12) United States Patent
Spadaccini et al.

(10) Patent No.: US 7,857,398 B2
(45) Date of Patent: Dec. 28, 2010

(54) LOCK-OUT FOR EMPTY LOAD DEVICE

(75) Inventors: Michael J. Spadaccini, Dexter, NY (US); Deepak Kumar, Kingston (CA)

(73) Assignee: New York Air Brake Corporation, Watertown, NY (US)

( * ) Notice: Subject to any disclaimer, the term of this patent is extended or adjusted under 35 U.S.C. 154(b) by 1021 days.

(21) Appl. No.: 11/622,763

(22) Filed: Jan. 12, 2007

(65) Prior Publication Data

US 2008/0168896 A1 Jul. 17, 2008

(51) Int. Cl.
B60T 8/18 (2006.01)
(52) U.S. Cl. .................................... 303/22.2
(58) Field of Classification Search ............... 303/22.2, 303/22.3, 22.8
See application file for complete search history.

(56) References Cited

U.S. PATENT DOCUMENTS

| | | | |
|---|---|---|---|
| 3,671,086 A | 6/1972 | Scott | |
| 3,960,411 A | 6/1976 | Beacon | |
| 5,039,174 A | 8/1991 | Beacon et al. | |
| 5,106,168 A | 4/1992 | McKay | |
| 5,192,119 A | 3/1993 | Shepherd et al. | |
| 5,211,450 A | 5/1993 | Gayfer et al. | |
| 5,269,594 A | 12/1993 | Barefoot | |
| 5,417,143 A | 5/1995 | Pasek | |
| 6,206,483 B1 | 3/2001 | LaLone | |
| 6,666,528 B1 | 12/2003 | Gayfer et al. | |
| 2003/0001431 A1 | 1/2003 | Vaughn | |
| 2009/0206651 A1* | 8/2009 | Wright | ..................... 303/22.2 |

FOREIGN PATENT DOCUMENTS

| | | |
|---|---|---|
| DE | 36 39 149 A1 | 5/1988 |
| DE | 40 22 481 A1 | 10/1991 |
| JP | 08-268246 A | 10/1996 |

* cited by examiner

*Primary Examiner*—Robert A Siconolfi
*Assistant Examiner*—Stephen Bowes

(57) ABSTRACT

The present empty/load device includes an inlet to receive a brake signal, an outlet for a brake device, load sensing element, a change over valve responsive to the load sensing element to proportion the pressure at the inlet and the outlet when empty is sensed by the load sensing element, a differential pressure element connecting the load sensing element and the change over valve, and a lock-out mechanism to prevent proportioning of the inlet pressure to the outlet when activated. The lock-out mechanism includes a lock-out valve, in a lock-out position, pneumatically preventing proportioning of the inlet pressure to the outlet. A first spring biases the lock-out valve from the lock-out position. A detent engages the lock-out valve and holding the lock-out valve in the lock-out position. The lock-out valve may be connected in parallel to the change over valve with respect to the inlet and the outlet. Alternatively, the lock-out valve may be connected in parallel to the both sides of the differential pressure element.

13 Claims, 5 Drawing Sheets

LOCK-OUT FOR EMPTY LOAD DEVICE

BACKGROUND AND SUMMARY OF THE DISCLOSURE

The present system relates generally to empty load devices and more specifically to a lock-out mechanism for an empty load device.

An empty load device is a device connected between the brake control valve and the brake cylinder. It senses the load in the car and determines how much of the brake signal from the control valve is to be provided to brake cylinder. If the device is loaded, a full signal is provided. If the device is not loaded, then a percentage of the brake signal is provided to the brake cylinder. The empty load device has a load sensing element which senses the load of the car and controls a changeover valve. The changeover valve is retained fully opened and connects the inlet with the outlet when the car is loaded and closes when the car is empty. The changeover valve also includes a pressure differential element which determines the proportioning of the brake signal to the brake cylinder when the changeover valve is changed over (closed) into the empty load position.

Although the changeover valves have historically been developed to either be empty or loaded, there are valves that have been designed which will adjust to different degrees of loading.

A typical empty load valve is disclosed in U.S. Pat. No. 5,211,450 to Gayfer et al., in a single housing. Another patent to Gayfer et al., U.S. Pat. No. 6,666,528, shows the load sensing and the proportion valve being in two different housing. Both these patents are incorporated herein by reference. In each of these, an arm is used to sense the displacement between the car body and the truck as an indication of weight. For bulk commodity cars, where access to the load sensing is through the wall of the bin. This type of empty load device may be used as exemplified by the Bacon U.S. Pat. No. 3,960,411. A device disclosed by Beacon et al., U.S. Pat. No. 5,039,174, shows the same structure used for bulk commodity cars as well as those which measure the load by the displacement between the truck and the body.

For certain tests and adjustments of the brake system, it is important that the empty load device be disabled such that it does not go into the empty load car condition. Pasek, U.S. Pat. No. 5,417,143, provides a lock-out mechanism for the empty/load to changeover valve. This is a mechanical lock-out of the actuator rod of the load sensing portion. Lock-out mechanism is automatically reset upon retraction of the actual rod.

The present empty/load device includes an inlet to receive a brake signal, an outlet for a brake device, load sensing element, a change over valve responsive to the load sensing element to proportion the pressure at the inlet and the outlet when empty is sensed by the load sensing element, a differential pressure element connecting the load sensing element and the change over valve, and a lock-out mechanism to prevent proportioning of the inlet pressure to the outlet when activated. The lock-out mechanism includes a lock-out valve, in a lock-out position, pneumatically preventing proportioning of the inlet pressure to the outlet. A first spring biases the lock-out valve from the lock-out position. A detent engages the lock-out valve and holds the lock-out valve in the lock-out position.

The lock-out valve may be connected in parallel to the change over valve with respect to the inlet and the outlet. Alternatively, the lock-out valve may be connected in parallel to the both sides of the differential pressure element.

The lock-out valve includes a recess for receiving the detent when the lock-out valve is in the lock-out position. A second spring biases the detent into engagement with the lock-out valve. The lock-out valve includes a handle for positioning the lock-out valve to the lock-out position and the detent includes a handle to disengage the detent from the lock-out valve and release the lock-out valve from the lock-out position.

These and other aspects of the present device will become apparent from the following detailed description of the invention, when considered in conjunction with accompanying drawings.

DETAILED DESCRIPTION OF THE PREFERRED EMBODIMENTS

Figure 1:
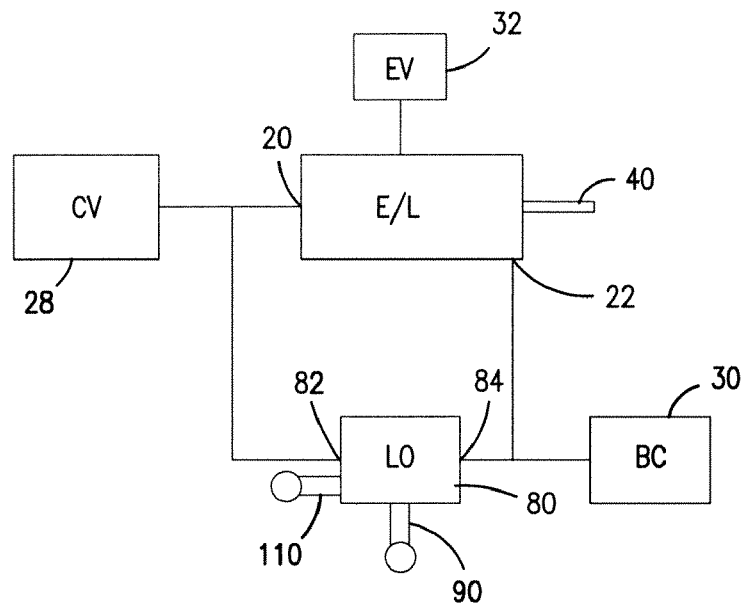
FIG. 1 is a schematic of portions of a train brake with the lock-out device connected in a first manner according to the present disclosure.
Figure 2:
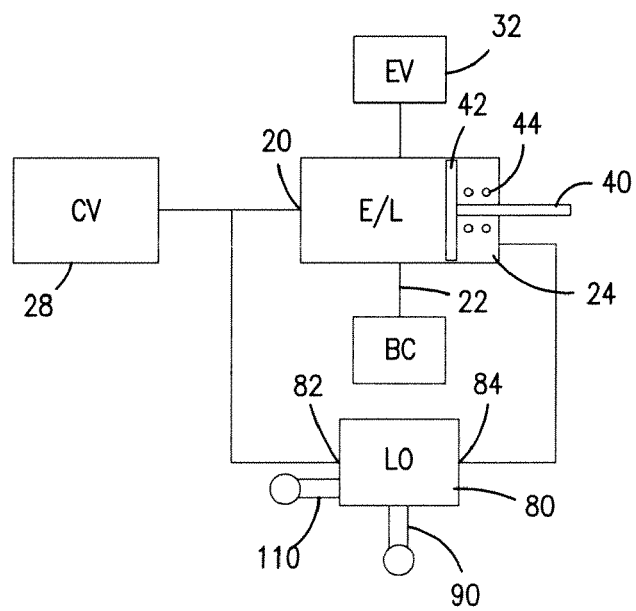
FIG. 2 is a schematic of portions of a train brake with the lock-out device connected in a second manner according to the present disclosure.
Figure 6:
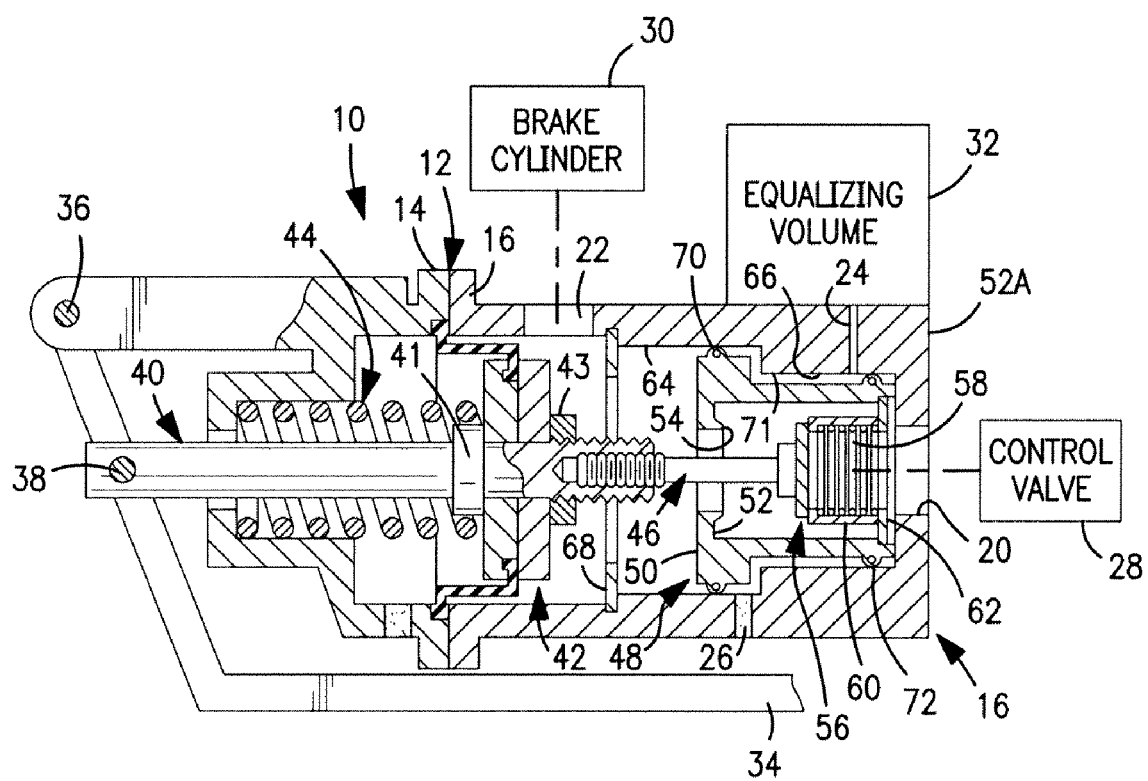
FIG. 6 is a cross-sectional view of an empty-load device of the prior art.

As is well-known in the industry and as illustrated in FIGS. 1 and 2, a car brake system includes a control valve 28 which provides a brake control signal to the brake cylinder 30 through an empty load device 10. The brake signal from the control valve CV 28 is provided at inlet 20 of the empty load device E/L 10 and the appropriate brake cylinder pressure is provided at outlet 22 from the empty load device 10 to the brake cylinder BC 30. The empty load device 10 includes a load sensing device, shown as a push rod or actuator 40. The position of the actuator 40 is determined by the load of the car. Actuator 40 may be connected to an element that senses the position of the truck to the body or may be connected to a wall of a commodity car to sense the weight of the commodity within the bin. The load sensed by the actuator 40 controls a changeover device or valve in the empty load valve 10 which proportions the input signal at inlet 20 by providing air to the equalizing volume EV 32 for an empty load. This provides a smaller signal at outlet 22 to the brake cylinder 30. An example of an empty load device is illustrated in FIG. 6 and will be discussed below.

A lock-out mechanism 80 is shown in FIGS. 1 and 2. In FIG. 1, the lock-out mechanism is connected between the inlet 20 and the outlet 22 of the empty load device 10. The lock-out mechanism is connected in parallel to the changeover valve and thus pneumatically prevents the reapportionment of the pressured inlet 20 the pressured outlet 22. Thus no matter what the weight of the car is and the position of the changeover valve, it is being bypassed by the lock-out mechanism 80.

As an alternative illustrated in FIG. 2, the lock-out mechanism 80 is connected between inlet pressure 20 of the empty load device 10 and port 24 on the non-pressurized side of the differential pressure element 42 which is connected to the actuator load sensing element 40. As is well-known, the pressurized side of the differential pressure element 42 is connected to the same chamber as the outlet 22 of the empty load device 10. A spring 44 of the differential pressure element 42 maintains the actuator 40 recessed into the empty load device 10 with no pressure. The actuator 40 can not sense the load without pressure being on its pressurized side. Initially the empty load device 10 allows input pressure 20 to flow to the outlet 22 and would normally move the differential pressure element 42 to the right in the Figure extending the actuator 40 of the load sensing element after overcoming the spring 44. Depending upon the position of the actuator 40, the changeover valve will or will not actuate. With the lock-out mechanism 80 connecting the inlet pressure 20 to the non-pressurized side of the pressure differential element 42, the initial pressure of the differential pressure element 42 will be locked in its non-extended position. Thus the changeover valve will not changeover regardless of the load, since the actuator 40 will not be extended to sense the load.

As will be explained in detail with respect to FIGS. 3 through 5, the lock-out device includes a lock-out valve 90 whose position determines the connection of the inlet 82 of the lock-out mechanism 80 and its outlet 84. Normally valve 90 prevents connection of the inlet 82 to the outlet 84 and the empty load device 10 operates an empty load device. In the lock-out position, the lock-out valve 90 connects the inlet 82 to the outlet 84. A spring (not shown in FIGS. 1 and 2) biases the lock-out valve 90 from its lock-out position. A detent 110 engages the lock-out valve 90 and holds the lock-out valve 90 in its locked out position. To reset the lock-out valve 90 from its locked out position, the detent 110 must be removed. The spring causes the lock-out valve 90 to return to its initial position terminating connection of the inlet 82 to the outlet 84 of the lock-out device 80.

Thus it can be seen that a simple lock-out device is shown which pneumatically prevents the proportioning of the inlet pressure to the outlet pressure of the empty load device 10, while lock-out valve 90 is in its locked out position. It is held and detained in the locked out position until manually reset.

The lock-out mechanism 80 may be a standalone device connected to the inlet 20 and the outlet 22 by T connections. Alternatively, the connection of the outlet 84 of the lock-out mechanism 80 may be connected to the brake cylinder test port shown in U.S. Pat. No. 6,206,483. Alternatively, the lock-out mechanism 80 may be mounted and become an integral part of the empty load device 10 and the connections of the inlet 82 and the outlet 84 of the lock-out mechanism 80 may be by external connections or internal connections with additional ports provided in the casing of the empty load device 10.

Figure 3:
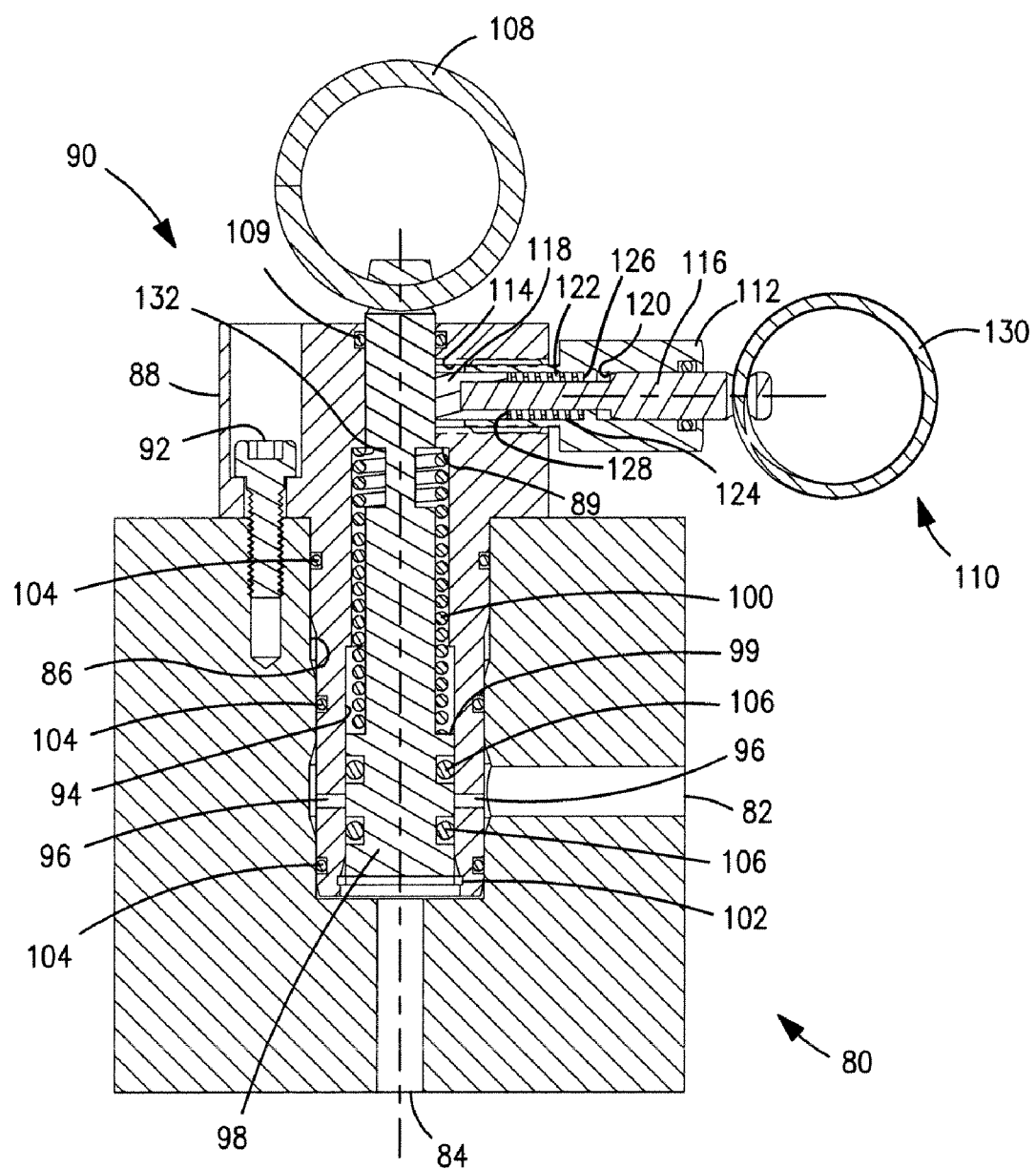
FIG. 3 is a cross-sectional view of a lock-out device in an unlock position according to the present disclosure.
Figure 4:
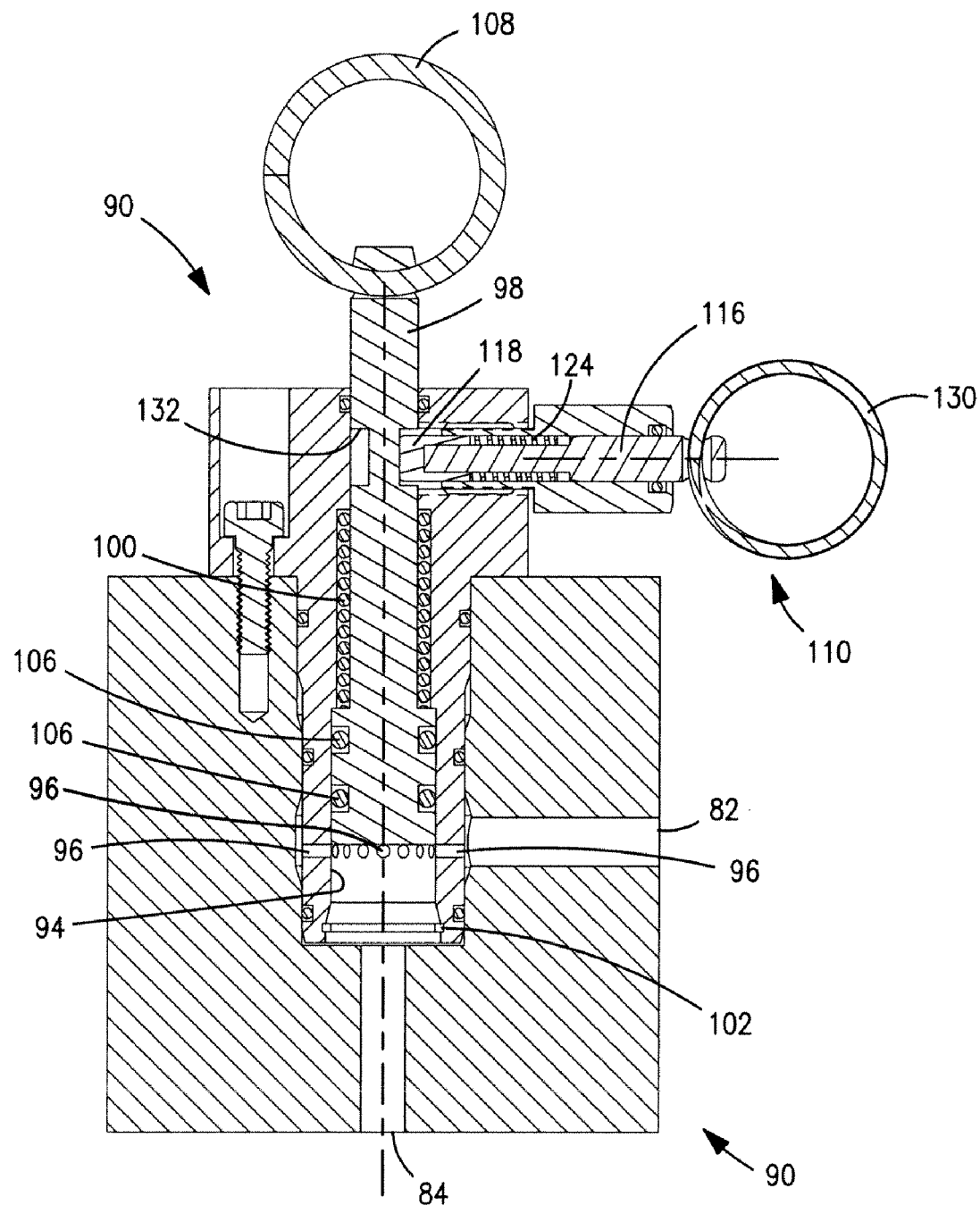
FIG. 4 is a cross-sectional view of a lock-out device in a lock position according to the present disclosure.
Figure 5:
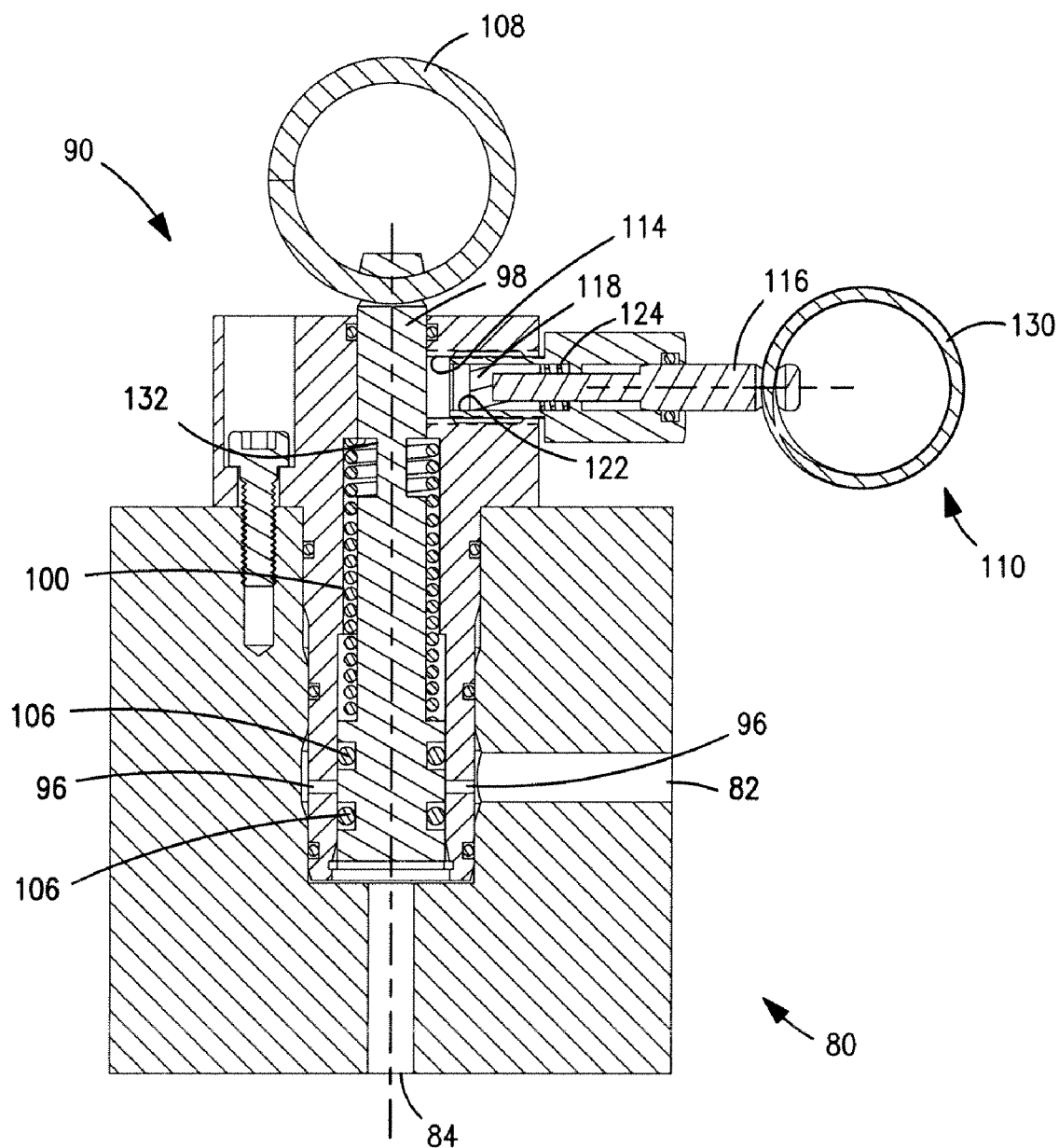
FIG. 5 is a cross-sectional view of a lock-out device in an unlocking position according to the present disclosure.

As illustrated in detail in FIGS. 3 through 5, the lock-out mechanism 80 includes a bore 86 extending between the inlet 82 and the outlet 84. A bypass cartridge 88, which includes the lock-out valve 90 and the detent 110, is mounted in the bore 86 and is secured to the lock-out mechanism 80 by fastener 92. Bypass cartridge 88 includes an internal bore 94 having a plurality of radial openings 96 connecting it to the inlet 82. This is specifically shown in FIG. 4. A valve element 98 slides within the bore 94. A spring 100 biases the valve element 98 towards its closed position illustrated in FIG. 3 where it abuts a stop 102, which is a retaining ring mounted in the cartridge 88. The ends of spring 100 rest against shoulder 89 on the cartridge 88 and the shoulder 99 of the valve element 98. O-rings 104 seal the cartridge 88 in the bore 86.

Two o-rings 106 are provided between the valve element 98 and the bore 94 in the cartridge 88. The space between the two elements 106 are used for the valve with respect to the connection of inlet 82 and the plurality of openings 96 in the cartridge 88. As illustrated in FIG. 3, the inlet 82 and the openings 96 are in the middle of the two o-rings 106 on the valve element 98. This isolates the inlet 82 and outlet 84. In FIG. 4 in the locked out position, the pair of o-rings 106 are displaced with the valve element 98 relative to the openings 96 such that direct communication between the inlet 82 and the outlet 84 is established.

The lock-out valve 90 includes a handle, illustrated as a pull ring 108 to allow positioning of the lock-out valve 90 and valve element 98 from its spring bias non-locked out position of FIG. 3 to the lock-out position in FIG. 4. An additional o-ring 109 is provided exterior the cartridge 88 on the valve element 98.

The detent 110 includes a detent housing 112 threadably received in a threaded opening 114 of the cartridge 88. A detent element 116 having an end cap 118 slides within a pair of bores 120 and 122 in the housing 112. Spring 124, between the shoulder 126 of the bore 122 and a surface 128 of the end cap 118, biases the detent element 116 to engage the valve element 98, as illustrated in FIG. 3. The detent element 116 includes a handle, illustrated as a pull ring 130.

When the valve element 98 is in the locked out position of FIG. 4, the end cap 118 of the detent is spring biased into a recess 132 of the valve element 98. This locks the valve element 98 in its lock-out position. To release the lock-out valve 90 from its lock-out position, handle 130 must be manually pulled against the spring 124 past the depth of the recess 132 as shown in FIG. 5. This release of the valve element 98 and spring 100 returns the value element 90 to its non-lock-out position. Once the valve element 98 has moved into its non-lock-out position, the detent element 110 can be released. It will then reengage the exterior of the valve element 98, as shown in FIG. 3.

From the above it can be seen that the lock-out valve 90 is normally in its non-lock-out position. Upon manual actuation to its lock-out position, it held by detent 110 in lock-out position. It is held in the lock-out position until reset by manually manipulating the detent element 110.

An empty-load device 10 shown in FIGS. 1 and 2 is shown in detail in FIG. 6. It includes a housing 12 having first housing portion 14 joined to a second housing portion 16 by fasteners. The empty-load device 10 includes a control valve port or inlet 20, a brake cylinder port or outlet 22, an equalizing volume port 24 and exhaust port 26.

A control valve 28 is connected to control valve port 20; brake cylinder 30 is connected to brake cylinder port 22; and an equalizing volume 32 is mounted to the housing portion 16 and connected to equalizing volume port 24.

A load-sensing lever 34 is pivotally connected at 36 to the housing portion 14 and is also pivotally connected at 38 to a push rod 40 extending from the housing portion 14. The sensing lever 34 contacts a portion of an unloaded structure of a railroad car track to sense the load force of the car.

A sensing piston 42 includes a pair of members which are connected to the body 12 by a diaphragm. The sensing piston 42 is secured to the push rod 40 between a shoulder 41 on the push rod and a threaded fastener 43. A spring 44 extends between the housing portion 14 and a face of the sensing piston 42 and biases the sensing piston 42 to the right in FIG. 6. It should be noted that the housing portion 14, the sensing lever 34, the push rod 40, the spring 44, and a sensing piston 42 is substantially as that shown in U.S. Pat. No. 3,671,086 to Scott and is the valve known as SC-1.

The push rod 40 includes an actuator 46 threadably received therein and extending through a ratio piston 48. The ratio piston 48 includes a first surface 50 facing a surface of the sensing piston 42 with the brake cylinder port 22 there between. A second surface 52 of the ratio portion 40 is smaller than the first surface 50. A change over or ratio valve, which bypasses the ratio piston when open, is mounted on and travels with the ratio piston 48. The ratio valve includes a valve seat 54 in the smaller surface 52 of the ratio valve seat 48, a valving member 56, a biasing spring 58, a spring cage 60, and retainer 62. The ratio valve as illustrated is a check valve which is responsive to the position of the actuator portion 46 of the push rod 40 as well as the differential pressure there across.

The housing portion 16 includes a first bore 64 and a second smaller bore 66 to receive the ratio piston 48. The end wall of bore 66 acts as a stop for the ratio pistons 48 in its release or loaded position. A stop ring 68 is provided in the larger bore 64 as a stop adjacent to the empty-load position. The exterior surface of the ratio piston 48 is separated from the internal bores 64 and 66 to create a space 71 therebetween which is sealed by seals 71 and 72. With the ratio piston 48 in the release or the loaded load position, the internal space 71 connects the equalizing volume port 24 with the exhaust port 26 and disconnects the equalizing port 24 from the control valve port 20. When the ratio piston 48 is moved to its empty-load position, the internal space 71 is connected only to the exhaust port 26 and the equalization volume port 24 is disconnected from the exhaust port 26 and is connected to the control valve port 20.

For the specific operation of the empty-load device illustrated in FIG. 6, reference is made to U.S. Pat. No. 5,211,450 which is incorporated herein by reference.

Although the present device has been described and illustrated in detail, it is to be clearly understood that this is done by way of illustration and example only and is not to be taken by way of limitation. The scope of the present device is to be limited only by the terms of the appended claims.

What is claimed:

1. An empty/load device including an inlet to receive a brake signal, an outlet for a brake device, a load sensing element, a change over valve for proportioning the pressure at the inlet and the outlet when an empty load is sensed by the load sensing element, a differential pressure element connecting the load sensing element and the change over valve, and a lock-out mechanism to prevent proportioning of the inlet pressure to the outlet when activated, wherein the lock-out mechanism comprises:
    a lock-out valve pneumatically connected to the empty/load device and, in a lock-out position, pneumatically preventing the proportioning of the inlet pressure to the outlet independent of the load;
    a first spring biasing the lock-out valve from the lock-out position; and
    a detent engaging the lock-out valve and holding the lock-out valve in the lock-out position.

2. The empty/load device of claim 1, wherein the lock-out valve is connected in parallel to the change over valve with respect to the inlet and outlet.

3. The empty/load device of claim 1, wherein the lock-out valve is connected in parallel to the both sides of the differential pressure element.

4. The empty/load device of claim 1, wherein the lock-out valve includes a recess for receiving the detent when the lock-out valve is in the lock-out position.

5. The empty/load device of claim 1, including a second spring biasing the detent into engagement with the lock-out valve.

6. The empty/load device of claim 1, wherein the lock-out valve includes a handle for positioning the lock-out valve to the lock-out position and the detent includes a handle to disengage the detent from the lock-out valve and release the lock-out valve from the lock-out position.

7. An empty/load device including an inlet to receive a brake signal, an outlet for a brake device, a load sensing element, a change over valve for proportioning the pressure at the inlet and the outlet when an empty load is sensed by the load sensing element, a differential pressure element connecting the load sensing element and the change over valve, and a lock-out mechanism to prevent proportioning of the inlet pressure to the outlet when activated, wherein the lock-out mechanism comprises:
    a lock-out valve, independent of the load. having an initial position which allows the proportioning of the inlet pressure to the outlet and a lock-out position which pneumatically prevents the proportioning of the inlet pressure to the outlet; and
    a detent engaging the lock-out valve and holding the lock-out valve in the lock-out position.

8. The empty/load device of claim 7, wherein the lock-out valve is connected in parallel to the change over valve with respect to the inlet and outlet.

9. The empty/load device of claim 7, wherein the lock-out valve is connected in parallel to the both sides of the differential pressure element.

10. The empty/load device of claim 7, wherein the lock-out mechanism includes a first spring biasing the lock-out valve from the lock-out position.

11. The empty/load device of claim 10, including a second spring biasing the detent into engagement with the lock-out valve.

12. The empty/load device of claim 7, wherein the lock-out valve includes a recess for receiving the detent when the lock-out valve is in the lock-out position.

13. The empty/load device of claim 7, wherein the lock-out valve includes a handle for positioning the lock-out valve to the lock-out position and the detent includes a handle to disengage the detent from the lock-out valve and release the lock-out valve from the lock-out position.

* * * * *